United States Patent [19]

Natarajan

[11] Patent Number: 4,887,206
[45] Date of Patent: Dec. 12, 1989

[54] AUTOMATED SYSTEM FOR ESTIMATING IMPACT ON INVENTORY COST DUE TO AN ENGINEERING CHANGE TO A COMPONENT

[75] Inventor: Bharath Natarajan, Marietta, Ga.

[73] Assignee: International Business Machines Corporation, Armonk, N.Y.

[21] Appl. No.: 138,782

[22] Filed: Dec. 29, 1987

[51] Int. Cl.[4] .............................................. G06F 15/21
[52] U.S. Cl. .................................... 364/401; 364/468; 364/300
[58] Field of Search ............... 364/403, 401, 468, 300; 235/385

[56] References Cited

U.S. PATENT DOCUMENTS

| | | | |
|---|---|---|---|
| 4,383,298 | 5/1983 | Huff et al. | 364/300 |
| 4,459,663 | 7/1984 | Dye | 364/200 |
| 4,531,186 | 7/1985 | Knapman | 364/300 |

OTHER PUBLICATIONS

LaForge, R. L. "A Decision Rule for Creating Planned Orders in MRP", vol. 26, No. 4, 1985, 115-26, *Prod. & Inventory Management.*
Hu, E. C. et al., "Designing an Effective Inventory Classification and Coding System", *Prod. & Invent. Manage. J.*, vol. 28, No. 4, 1987, 53-56.
Andrew, C. G. "Engineering Changes to the Product Structure Opportunity for MRP Users", *Prod. Invent. Manage.*, vol. 16, No. 3, 3rd quarter 1975, 76-86.

*Primary Examiner*—Clark A. Jablon
*Attorney, Agent, or Firm*—Whitham & Marhoefer

[57] ABSTRACT

A conceptual tool for inventory cost analysis based on an engineering change request for an item. The invention is a conceptual tool that uses both existing and new product structure in which an engineering change is requested on the item. Based on the product in which the item in question is being used, the system would identify all affected products (active and inactive), evaluate the on-hand inventory costs of raw material and finished products by accessing an inventory database. The system automatically designs an inventory model to evaluate the work-in-process inventory for all products affected by the change through direct access to item and process parameter data from an engineering database. A consolidated inventory cost for raw material, work-in-process and finished goods is derived based on the engineering change request and advises the user of the cost impact.

4 Claims, 2 Drawing Sheets

INVENTORY IMPACT ANALYSIS REPORT

E.C. PART NO.: _____

LIST OF AFFECTED PART NOS. AND DESCRIPTION (LIST SUPPRESSED ON REQUEST)

| PART NO. | DESCRIPTION |
|---|---|
| — | — |
| — | — |
| — | — |

INVENTORY IMPACT BY PRODUCT GROUP:

| RAW MATERIAL COST | ESTIMATED WIP COST | FINISHED GOODS COST |
|---|---|---|
| — | — | — |
| — | — | — |
| — | — | — |
| NET: — | — | — |

TOTAL INVENTORY IMPACT: _____

INVENTORY IMPACT ANALYSIS REPORT

E.C. PART NO.: _____

LIST OF AFFECTED PART NOS. AND DESCRIPTION (LIST SUPPRESSED ON REQUEST)

| PART NO. | DESCRIPTION |
|---|---|
| — | — |
| — | — |
| — | — |

INVENTORY IMPACT BY PRODUCT GROUP:

| RAW MATERIAL COST | ESTIMATED WIP COST | FINISHED GOODS COST |
|---|---|---|
| — | — | — |
| — | — | — |
| — | — | — |

NET: ___   ___   ___

TOTAL INVENTORY IMPACT: _____

AUTOMATED SYSTEM FOR ESTIMATING IMPACT ON INVENTORY COST DUE TO AN ENGINEERING CHANGE TO A COMPONENT

CROSS-REFERENCE TO RELATED APPLICATIONS

The subject matter of this application relates to that of copending application Ser. No. 07/100,395 filed September 24, 1987, now patent No. 4,847,761, by Kate M. Ferriter and Robert B. Mathis for "Automated Bill of Materials" and application Ser. No. 07/138,781 filed December 29, 1987, by Bharath Natarajan for "An Automated System for Evaluating the Sensitivity of Inventory Costs Due to Fluctuations in Customer Demand", both of which are assigned to a common assignee with this application. The disclosures of these copending applications are incoroporated herein by reference.

BACKGROUND OF THE INVENTION

1. Field of the Invention

The present invention generally relates to a computer based inventory evaluation system and, more particularly, to a system for automatically providing a manager with an estimate of inventory impact due to an introduction of an engineering change to an item in process. This item could be a new item or an old item used in an established product.

2. Description of the Prior Art

The process of designing, developing and manufacturing a new product, or making major changes to existing products, presents many challenges to product managers and manufacturing managers to bring a product to market for the least cost, within schedule while maintaining product quality. In today's highly competitive industries, product managers and manufacturing managers require information to address many problems that arise because of the complexity of new products and the complexity of world-wide production and the changing nature of competition. The requirement that products be manufactured for the least possible cost is important in all industries. Of all the costs associated with manufacturing a product, inventory cost is one of the primary costs, and all enterprises try to reduce this cost. Recent advances in manufacturing systems, utilizing proven Japanese techniques of production, which try to plan the arrival of all components and materials "just-in-time" to manufacture is a prime example of efforts to reduce inventory cost.

A number of books and articles have been published that address the issue of inventory costs. notably that industry reference *Production-Inventory Systems, Planning and Control* by Elwood S. Buffa, published by Richard D. Irwin, Inc., Homewood, Illinois, and *Analysis of Inventory Systems* by G. Hadley and T. M. Whitin, published by Prentice-Hall International, Inc., to name two. All systems to date refer to various types of rules for planning purposes in order to reduce inventory costs. When customers place demand for a product from a manufacturer, the planning department analyzes the demand and establishes inventory required to manufacture the product. That inventory, calculated through the bill of material is the component inventory or raw material inventory. In general, components are assembled together through various stages of the manufacturing process produce the finished product. All during the manufacturing process, labor and overhead costs are added to the raw material costs to compute the total cost of the product.

Customer demand for a product often changes over time, as do the specifications for the product as the product is improved or modified to realize economies in the manufacturing process. The engineering department normally releases engineering change notices (ECNs) reflecting changes to specifications of a given product. ECNs can be changes in the bill of material lists or component specification changes. When a significant change occurs, there can be work-in-process inventory or vendor committed components that may have to be discarded, with an attendant increase in manufacturing costs.

Many manufacturing systems are available in the market such as IBM Corp.'s COPICS (Communications Oriented Production Information and Control System) that provide an inventory accounting module which provides the capability to analyze inventory costs of all items in the warehouse or storage locations. Competing products marketed by MSA, Inc., Cullinet and others have similar capabilities but do not provide any means to evaluate total inventory cost impact due to engineering changes to a component.

What is needed is an automated system that automatically estimates the work-in-process costs of all affected in-process items as well as raw material item costs pertaining to an affected product. Such a system should take into account that a change to a single component may impact on multiple products in which the component is used. Preferably, the system should be an expert system to provide an easy to use interface with a manager who needs to evaluate various options in effecting an engineering change notice. Expert systems are a branch of computer science, generally refered to as artificial intelligence, which exhibits characteristics normally associated with human behaviour including learning, reasoning, solving problems and so forth. More specifically, an expert system or "knowledge based system" uses certain rules and a database to provide a user interactive environment in the form of a "consultation dialog", just as the user would interact with a human expert.

SUMMARY OF THE INVENTION

It is therefore an object of this invention to provide an easy to use, user interactive system that takes information from engineering change notices released for an item and estimates the impact on inventory cost.

It is another object of this invention to provide a computer implemented system that specifically addresses the inventory cost impact due to changes in component specifications.

According to this invention, a computer automated system provides the capability of accessing the inventory cost impact of engineering change notices in an easy to use, simple and automated way. The invention is a conceptual tool that uses both existing and new product structure in which the item in question is being used. The invention provides visibility to both the engineering manager releasing the engineering change as well as the manufacturing manager trying to implement the engineering change request. The tool traces all bills of material in which the item in question is being used and establishes the current status of the item as active or inactive. Based on the information, the analysis tool according to the invention accesses the inventory database for all raw material and finished product in which the item is used. The system automatically calculates the cost values by accessing a financial database. To estimate the work-in-process inventory, the system automatically accesses the inventory model analysis as described in my above-referenced copending patent application Ser. No. 07/138,782. An enhancement to the inventory model is provided by this invention in order to evaluate all affected items and consolidate the cost data.

The process performed by the invention in making the estimate of the costs due to the inventory impact of an engineering change notice includes the following steps:

(i) Identify all end items affected by the change notice.
(ii) Establish if the items identified are finished products or work-in-process items.
(iii) Evaluate the cost impact of finished items.
(iv) Develop raw material and work-in-process inventory costs of items in process using an inventory model as specified by my copending patent application Ser. No. 07/138,782.
(v) Estimate the total cost and print out or display cost variations for each engineering change notice.

As new products are released to be manufactured, all pertinent information about the new product, such as bills of material data and manufacturing routing information, are transmitted to a production planning system, such as the modules in the IBM Corp. product COPICS.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figures 1, 3:
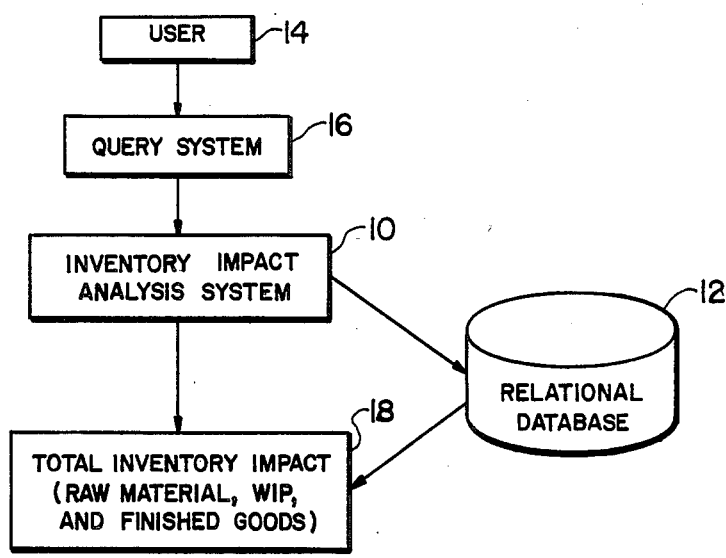
FIG. 1 is a functional block diagram showing the user and associated system interface from a query system to the inventory impact analysis system and its relation to a database according to the invention.
FIG. 3 is a flow diagram providing the detailed logic structure of the inventory impact analysis system according to the invention together with its relation to an inventory modelling system.

Referring now to the drawings, and more particularly to FIG. 1, there is shown in functional block diagram form the relationship of the inventory impact analysis system 10 according to the invention to a database 12 and a user 14. All system operations are transparent to the user 14 as he or she interfaces only with a query system 16. The user 14 inputs the part number affected due to an engineering change notice, and the system 10 automatically accesses the bills of material file in the database 12 to evaluate all impacted part numbers due to the change, evaluates the raw material cost of the affected item and associated impacted items, and calculates the inventory model to estimate the work-in-process inventory and the resulting finished goods cost, providing an output 18 of the total inventory impact for evaluation by the user. Calculation of the inventory model is described in more detail in my copending application Ser. No. 07/138,781.

The database 12 can be any of several products currently available, but for purposes of this preferred embodiment, IBM Corp.'s DataBase 2 (DB2) is used. DB2 is a relational database management system, but it will be understood by those skilled in the art that other databases, including hierarchical databases, could be used. General information on IBM's DB2 can be had with reference to publication GC26-4073-2 published by IBM Corp. The query system 16 can be an expert system, but for purposes of the preferred embodiment, IBM's Restructured EXtended eXecutor (REXX) language is used. A description of the REXX language is provided in "Vitrual Machine/Systems Product, System Product Interpreter User's Guide", Release 4, publication SC24-5238-2 published by IBM Corp.

Figure 2:
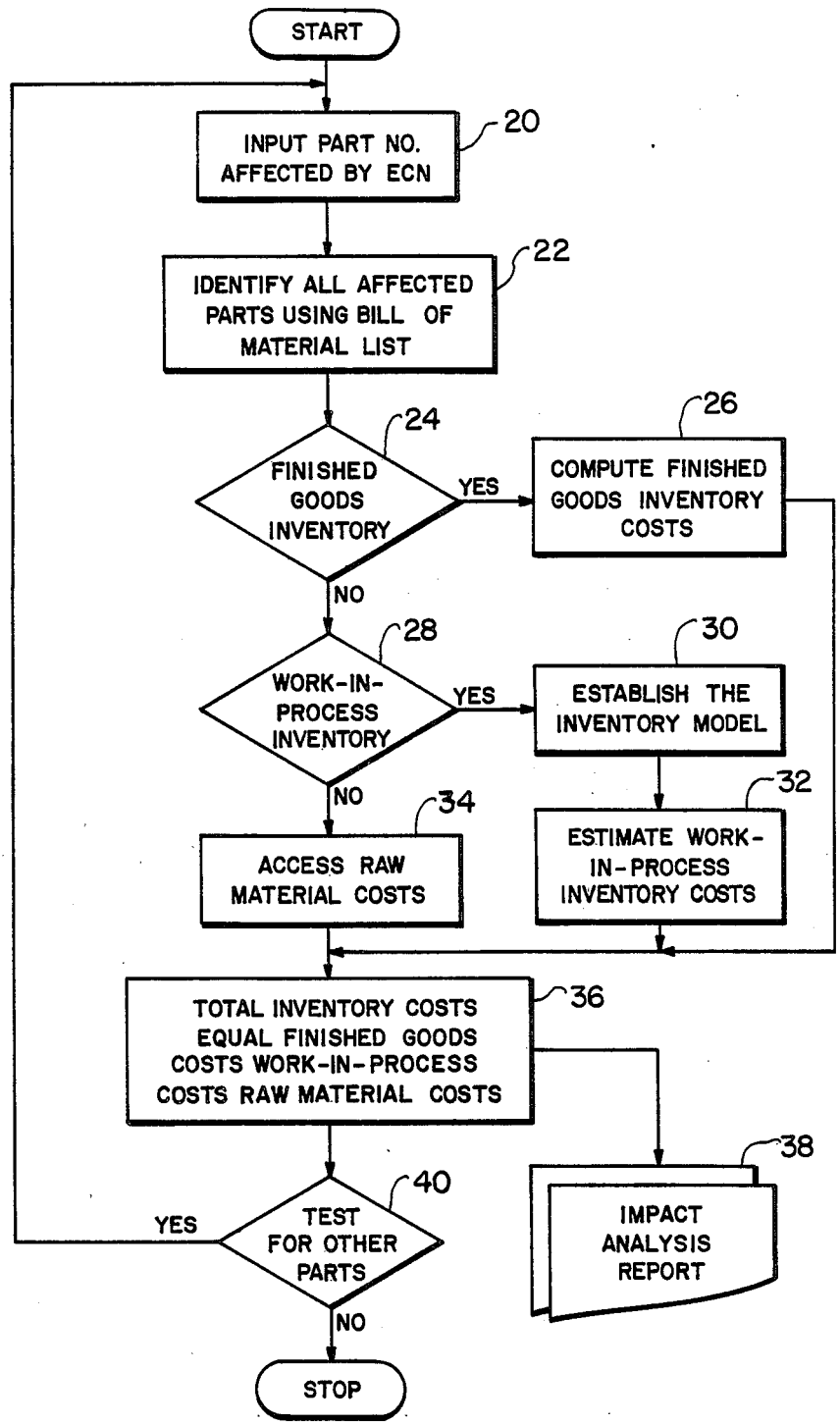
FIG. 2 is an illustration of a sample inventory impact analysis report that describes the affected part numbers and resulting inventory impact on raw material cost, work-in-process cost and finished goods cost due to an engineering change to a part number.

Using the inventory impact analysis system 10, the user can input queries directed to the impacted part numbers to obtain a description and associated raw material inventory impact cost, estimated work-in-process cost as well as the finished goods cost associated with the respective part numbers together with the net summarized impact. The flow chart of FIG. 2 illustrates the detailed logic of the inventory impact analysis system 10 where the system takes the engineering change notice part numbers input by the user in function block 20 and first accesses the bill of material file in the database 12 for all affected part numbers in function block 22. The system then tests the items retrieved in decision block 24 to determine if any affected part number has been stocked in inventory as finished goods. Based on the date of the effective change to the part number in question, the total finished goods inventory is evaluated in fucntion block 26. Next, in decision block 28, the system tests the items retrieved from the database 12 to determine if any of the affected part numbers are in work-in-process inventory. If any of the affected part numbers are work-in-process inventory, the system calculates an inventory model in function block 30 as described in my copending patent application Ser. No. 07/138,781 and, in function block 32, evaluates the work-in-process inventory costs of all affected part numbers based on the demand values of the respective part numbers.

The system then looks for raw material inventory cost of all impacted part numbers in function block 34 and estimates the total material inventory cost in function block 36. The total inventory impact is then printed in output block 38 and/or displayed on a computer display screen as shown in FIG. 3. Finally, a test is made in decision block 40 to determine if the user wants to test another part number. If so, control returns to function block 20 to repeat the process.

With reference to FIG. 3, the user just enters the part number that is being changed due to an engineering change request and the system automatically calculates the cost impact using the logic described with reference to FIG. 2. The system provides the capability to describe the cost values by respective product groups. Thus, as shown in FIG. 3, in response to the user entering the engineering change part number the field indicated, the system first lists the affected part numbers and their respective descriptions. Then, the calculated inventory impact by product group is displayed. The product groups are raw material, work-in-process inventory and finished product. These costs are itemized and subtotaled, and a total inventory cost is displayed.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. An automated method implemented on a computer for evaluating inventory impact due to an engineering change to an item, said method providing for an inventory cost analysis due to the engineering change, said method automatically performing the following steps in response to a user inputting a part number identifying the item affected by the engineering change:
   retrieving from a bill of materials database all parts affected by the engineering change to the item; and
   displaying a list of affected part numbers and the costs due to the inventory change.

2. The automated method as recited in claim 1 wherein the step of retrieving is performed by product group including raw materials, work-in-process inventory and finished goods inventory, said method further comprising the steps of:
   computing finished goods inventory costs;
   generating an inventory model and evaluating work-in-process inventory costs;
   accessing raw material costs; and
   totaling inventory costs by adding finished goods inventory costs, work-in-process inventory costs and raw material costs.

3. The automated method recited in claim 2 wherein the step of displaying the list of affected part numbers and the costs due to the inventory change is performed by product group including raw materials, work-in-process inventory and finished goods inventory.

4. The automated method recited in claim 2 further comprising the step of determining if other parts are to be tested to provide alternative inventory impact changes due to varied engineering changes and, if so, repeating the steps of retrieving all parts affected by the engineering change and displaying a list of affected part numbers and costs due to the inventory change.

* * * * *